United States Patent [19]

Yamanouchi

[11] Patent Number: 4,853,813
[45] Date of Patent: Aug. 1, 1989

[54] MAGNETIC HEAD SUPPORTING DEVICE

[75] Inventor: Hiroshi Yamanouchi, Tokyo, Japan

[73] Assignee: Sony Corporation, Tokyo, Japan

[21] Appl. No.: 189,317

[22] Filed: May 2, 1988

Related U.S. Application Data

[63] Continuation of Ser. No. 879,373, Jun. 27, 1986, abandoned.

[30] Foreign Application Priority Data

Jun. 29, 1985 [JP] Japan .................................. 60-143256

[51] Int. Cl.⁴ .......................... G11B 17/32; G11B 5/48
[52] U.S. Cl. .................................................... 360/104
[58] Field of Search .................................. 360/102–106

[56] References Cited

U.S. PATENT DOCUMENTS

| | | | |
|---|---|---|---|
| 2,704,234 | 3/1955 | Love et al. | 384/280 |
| 3,931,641 | 1/1976 | Watrous | 360/104 |
| 4,286,297 | 8/1981 | Root et al. | 360/104 X |
| 4,315,293 | 2/1982 | Winkler | 360/104 X |
| 4,355,339 | 10/1982 | King et al. | 360/105 |
| 4,428,012 | 1/1984 | Applequist et al. | 360/106 |
| 4,549,239 | 10/1985 | Kawajiri | 360/105 |
| 4,577,521 | 3/1986 | Takikawa | 360/106 X |
| 4,630,155 | 12/1986 | Hasegawa et al. | 360/106 |
| 4,642,717 | 2/1987 | Matsuda et al. | 360/105 |
| 4,665,453 | 5/1987 | Mikamoto et al. | 360/99 X |

FOREIGN PATENT DOCUMENTS

| | | | |
|---|---|---|---|
| 54-54614 | 5/1979 | Japan | 360/103 |
| 60-223063 | 11/1985 | Japan | 360/104 |
| 60-224145 | 11/1985 | Japan | 360/104 |

Primary Examiner—John H. Wolff
Attorney, Agent, or Firm—Philip M. Shaw, Jr.

[57] ABSTRACT

In a magnetic recording device wherein a magnetic head is maintained in elastic contact with a recording medium, an improved magnetic head supporting device integrates a hinge, a swingably supported arm and a magnetic head holding member into a unitary flat spring member. Further, an elongate oil retaining bearing sleeve is provided to guide the magnetic head cartridge in the horizontal or radial direction relative to the recording medium.

11 Claims, 5 Drawing Sheets

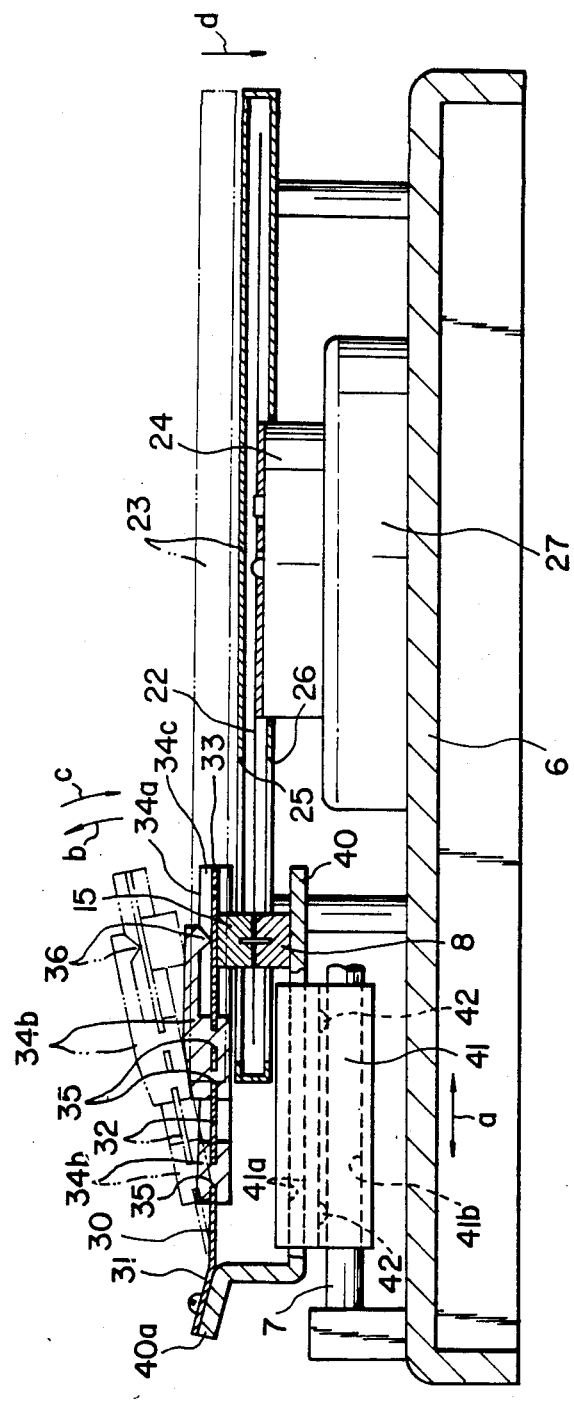

MAGNETIC HEAD SUPPORTING DEVICE

This is a continuation of application Ser. No. 879,373 filed Jun. 27, 1986, now abandoned.

TECHNICAL FIELD

This invention relates generally to a magnetic head supporting device for supporting a magnetic head for recording and reproducing, for example, in a floppy disk player. More specifically, this invention relates to an improved flat spring member and oil retaining bearing sleeves.

BACKGROUND OF THE INVENTION

Magnetic recording and reproducing requires that the magnetic head contact the recording medium, e.g. a floppy disk, very accurately in order to maximize track density. Variations introduced by dimensional and positional errors result in mistracking and increased access time. A conventional magnetic head supporting device for a floppy disk player will be described with reference to FIGS. 1 and 2.

A carriage 1, namely a supporting member, is made of a synthetic resin substantially in the form of a rectangular plate. A front bearing arm 2 and a rear bearing arm 3 are formed integrally with the carriage 1 so as to project from one side surface of the carriage 1. Oil retaining bearings 4 and 5 are force fitted in the front and rear bearing arms 2 and 3, respectively. A guide shaft 7, horizontally mounted on a chassis 6 (see FIG. 2), is received through the oil retaining bearings 4 and 5 to guide the carriage 1 for horizontal movements in directions indicated by a double-headed arrow a. A lower magnetic head 8 is attached, adhesively or likewise, to the upper surface of the front end of the carriage 1.

A hinge 10, made of a flat spring, is fixed to the upper surface of the rear end wall of the carriage 1 with screws. An arm 11 is fixed at its rear end to the hinge 10. Thus, the arm 11 is supported on the carriage 1 by the hinge 10 so as to be swingable in a vertical plane as indicated by arrows b and c in FIG. 2. The arm 11 is made of a synthetic resin in the form of a rectangular plate. Projection 12 is integral with the arm 11 and projects from one side surface thereof. At the rear end of the carriage 1 is a torsion coil spring 13 which applies pressure through one end 13a to the arm 11, biasing arm 11 downward (i.e. direction C) on the hinge 10.

A magnetic head 15 is held elastically on a magnetic head holding member 14 made of a flat spring and attached to the lower surface of the front end of the arm 11. The magnetic head holding member 14 is designated generally as a gimbal and is typically formed by punching a rectangular shape into a flat, phosphor-bronze spring or stainless spring. As illustrated in FIG. 1, the magnetic head holding member 14 consists integrally of a magnetic head holding part 16, a fixing part 17 formed in the shape of a rectangular frame surrounding the holding part 16, and an elastic functional part 18, which interconnects the holding part 16 and the fixing part 17. Holding part 16 and the elastic functional part 18 are connected by a pair of connecting parts 19 on a line X'. The elastic functional part 18 and the fixing part 17 are connected by a pair of connecting parts 20 on a line Y' extending at right angles to the line X'. The magnetic head 15 is attached adhesively or likewise to the underside (as viewed in the figures) of the holding part 16 with the head's center on the center 0 of the holding part 16. The fixing part 17 is fixed adhesively or likewise to the lower surface of the front end of the arm 11.

Referring now to FIG. 2, a floppy disk 22 is contained within a cartridge 23. The floppy disk 22 is a recording medium made of a magnetic sheet. The cartridge 23 is mounted horizontally on the chassis 6 with the floppy disk 22 placed horizontally on a turntable 24. Then, upper and lower magnetic heads 15 and 8 engage the cartridge 23, entering the cartridge through upper and lower openings 25 and 26 to contact with the respective upper and lower sides of the disk 22. The cartridge 23 is adapted to be inserted into a cartridge holder, not shown in this figure. The projection 12 (FIG. 1) rests on part of the upper surface of the cartridge holder. Accordingly, when the cartridge 23 is lowered in a direction indicated by arrow d, from an upper position indicated by alternate long and short dashed lines to a working position indicated by continuous lines, arm 11 is turned by the torsion coil spring 13, in the direction indicated by arrow c, from an upper position indicated by alternate long and short dashed lines to a lower position indicated by continuous lines.

After the cartridge 23 has thus been loaded on the chassis 6, a motor for driving the turntable 24 is actuated to rotate the floppy disk 22 within the cartridge 23. The carriage 1 is moved horizontally by a carriage driving mechanism, not shown, in a direction indicated by the arrow a to move the upper and lower heads 15 and 8 radially with respect to the disk 22, enabling the desired recording or reproducing operation. Since the magnetic head 15 is held on the magnetic head holding member 14 so as to be tiltable in directions indicated by double-headed arrows X and Y and so as to be moveable in directions indicated by a double-headed arrow Z (FIG. 1), the magnetic head 15 is held very satisfactorily in elastic contact with the flexible floppy disk 22.

As noted above, high quality recording and reproducing require that dimensional and positional errors in the contact between the magnetic head and the recording medium be minimized. However, the conventional supporting device described above is inherently inaccurate, permitting dimensional variations in assembly and in ambient temperature and humidity conditions to adversely affect the contact and positioning of the magnetic head and the recording medium. The difficulty of the conventional device is more fully described with reference to FIGS. 1 and 2.

The hinge 10 is screwed to the upper surface of the rear end wall of the carriage 1. The arm 11 is screwed at its rear end to the hinge 10. The magnetic head holding member 14 is attached adhesively or likewise to the lower surface of the front end of the arm 11. All of these fastening steps result in troublesome assembly work. Furthermore, as is well known, since the magnetic head 15 needs to be positioned with respect to the floppy disk 22 highly accurately, the hinge 10, the arm 11 and the magnetic head holding member 14 need to be assembled highly accurately, a troublesome and difficult requirement. Also, since it is inevitable that there will be both dimensional and positional errors between these parts in their assembly, a troublesome adjustment is required.

Conventionally, the arm 11 is formed by molding a synthetic resin. As a result, the arm 11 is liable to expand or to contract due to variations in temperature and/or the humidity. This expansion and contraction is likely to cause variations in dimensions which require high accuracy such as, for example, the distance $L_1$, between the center of the magnetic head holding member 14 and the center line of the bolt holes for receiving the screws for fastening the arm 11 to the hinge 10, and the distance W₁ between the respective centers of the bolt holes (FIG. 1). These variations cause problems in the tracking of the floppy disk 22 magnetic tracks by the head 15. These tracking variations reduce the interchangeability characteristics of the floppy disk 22.

Thus, in the conventional magnetic head supporting device of the type having upper and lower magnetic heads, as described above, the condition of contact of the upper and lower magnetic heads 15 and 8 with the floppy disk 22 is deteriorated by the relative positional variation (offset) between the upper and lower magnetic heads 15 and 8 due to the expansion or contraction of the arm 11.

Another aspect of the conventional magnetic head supporting device which contributes to undesirable variations in position involves the motion of the carriage 1 along guide shaft 7, best seen with reference to FIG. 1. In this conventional design, carriage front bearing arm 2 and rear bearing arm 3 are force-fitted with oil retaining bearings 4 and 5, respectively. The guide shaft 7, horizontally mounted on the chassis 6 (FIG. 2), is received through the oil retaining bearings 4 and 5 to guide the carriage 1 for horizontal movement in directions indicated by a double-headed arrow a. As shown in FIG. 1, the conventional shaft-bearing relationship permits undesirable movement in the directions indicated by arrows e and f. These positional variations, which result from bearing-insertion error and subsequent bearing wear, produce tracking errors which reduce signal reproduction quality and which restrict floppy disk 22 interchangeability.

SUMMARY OF THE INVENTION

The above and other problems are overcome by the present invention which provides an improved magnetic recording device in which a magnetic head for reproducing and recording is elastically maintained in contact with a recording medium. One improvement specifically comprises combining an arm swingably supported on a support member or carriage, a hinge and a magnetic head holding member in a unitary flat spring member. Another improvement comprises an elongate oil retaining bearing sleeve which is configured to receive a guide shaft which enables a carriage driven mechanism to move the carriage supported magnetic heads in the horizontal, or radial, direction necessary to record or to reproduce signals on the recording medium.

By integrating the hinge, the arm and the magnetic head holding member of a magnetic head supporting device into a single member, the troublesome work of assembling a plurality of parts is unnecessary. The magnetic head supporting device can be simply assembled for accurate contact of the magnetic heads with a recording medium, hence remarkably improving the assembly efficiency. Furthermore, since the hinge, the arm and the magnetic head holding member are formed in a single member and need not be assembled together, errors accompanying the assembly work are eliminated completely. Also, the adjustment of the magnetic head supporting device after assembly is remarkably facilitated.

Still further, since the expansion and contraction of a single flat spring member due to temperature and/or humidity variations is very small, those dimensions of the arm which require high accuracy vary only scarcely. Resultantly, the variation of the magnetic head in tracking position relative to the floppy disk magnetic tracks is prevented. This, in turn, provides signals which can be recorded and reproduced surely and accurately.

As applied to those devices described above as having two magnetic heads disposed one over the other, the present invention improves the reliability of recording and reproducing performance of the associated apparatus remarkably. The arm expands and contracts only scarcely so there is no possibility of the dislocation (offset) of the upper and lower magnetic heads relative to each other.

Furthermore, since according to the present invention, the magnetic head is brought elastically into contact with a recording medium by the intrinsic resilience of the flat spring member, the torsion coil spring, which is necessary in the conventional magnetic head supporting device, is unnecessary, thereby reducing the number of parts required.

Another, significant improvement of the invention relates to the longitudinal slide bearings for moving the assembly radially with respect to the disk. As described above, with reference to the conventional device, forced-fit oil retaining bearings are used to horizontally move the carriage along a chassis supported guide shaft. The present invention eliminates assembly error and wear difficulties caused by the forced-fit oil retaining bearings. The present invention provides at least one elongate oil retaining bearing sleeve which does not require "force-fitting" and which sleeved bearing is longer than the conventional bearings. These characteristics of the bearings contribute to improved carriage positioning and reduce variations introduced by assembly and wear.

In a particularly preferred embodiment, a single elongate bearing made from oil impregnated, sintered metal is provided. This embodiment completely eliminates assembly error and wear difficulty.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE FIGURES

FIG. 5 is a vertical, enlarged, cross-sectional view of the magnetic head supporting device of FIG. 3.

DETAILED DESCRIPTION OF THE INVENTION

Figure 1:
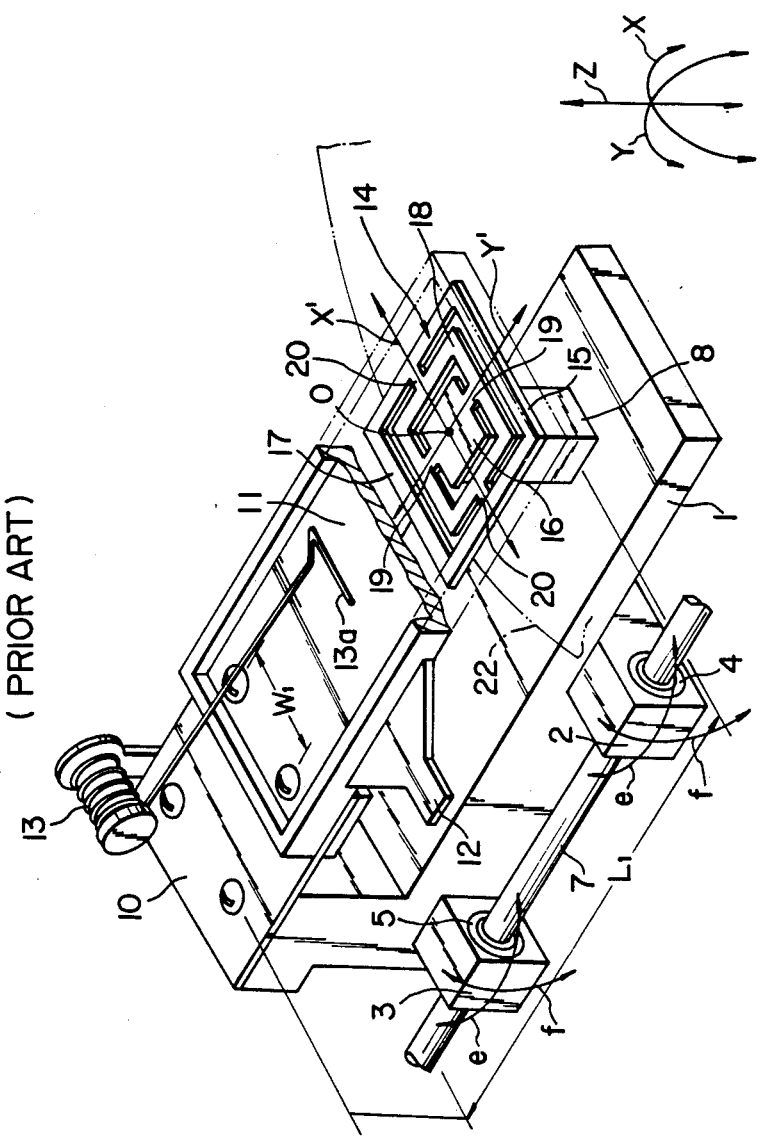
FIG. 1 is a perspective view of a prior art magnetic head supporting device for a floppy disk player.
Figure 2:
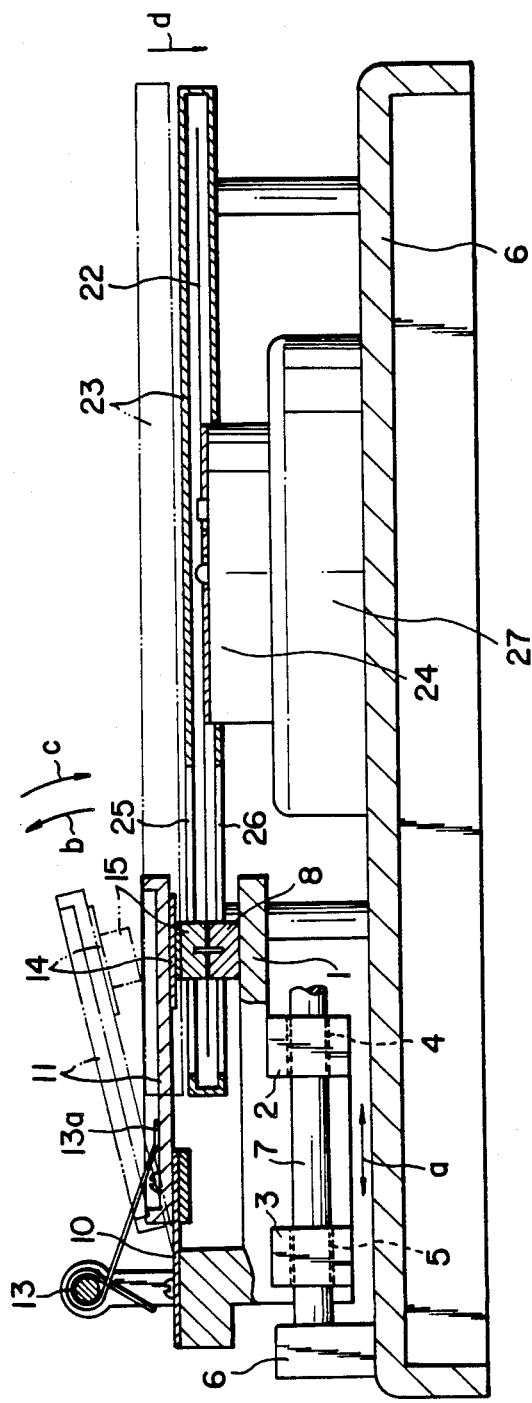
FIG. 2 is a vertical, enlarged, cross-sectional view of the prior art magnetic head supporting device of FIG. 1.

A magnetic head supporting device, in a preferred embodiment, according to the present invention as applied to a floppy disk player will be described with reference to FIGS. 3 through 5. In these figures, parts which are similar to those previously described with reference to FIGS. 1 and 2 are denoted by the same reference numerals and the description of similar parts will be omitted to avoid duplication.

While the preferred embodiment described below applies to a double head type magnetic head supporting device provided with upper and lower magnetic heads, it is intended that the present invention is applicable also to a single head type magnetic head supporting device provided with one magnetic head on the flat spring member. It is also intended that the present invention is not limited to the magnetic head supporting device for a floppy disk player, but it is intended that the present invention is applicable also to the transducing head supporting device of various recording and reproducing apparatus in which various recording and reproducing heads are to be brought into elastic contact with various recording media, respectively.

Figure 3:
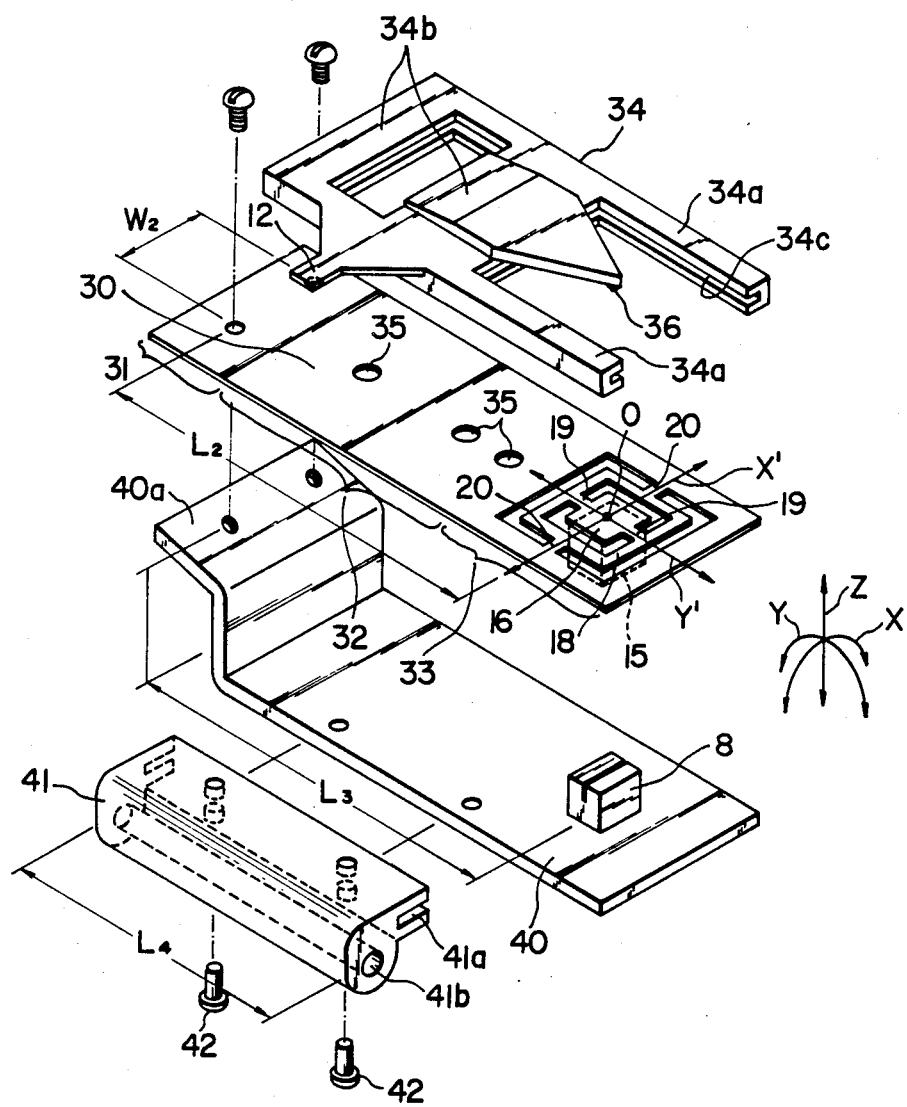
FIG. 3 is an exploded perspective view of a magnetic head supporting device, according to the present invention, in a preferred embodiment as applied to a floppy disk player.
Figure 4:
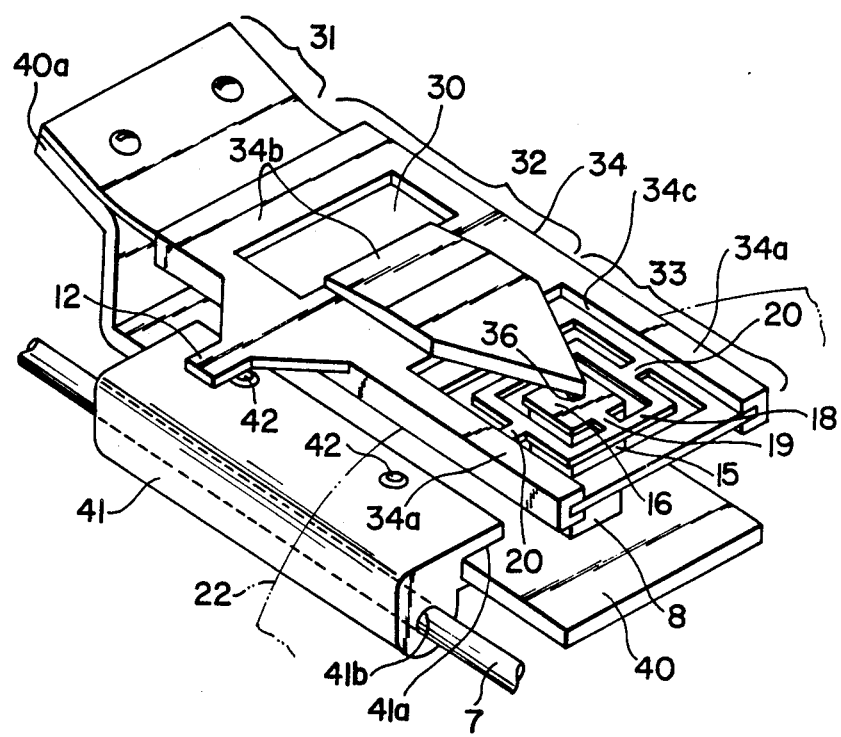
FIG. 4 is a perspective view of the magnetic head supporting device of FIG. 3, in which the device is assembled.

Referring now to FIG. 3, according to the present invention, a single flat spring member 30 has sections which correspond to the hinge 10, the arm 11 and the magnetic head holding section 14 of the previously described, conventional magnetic head supporting device. The flat spring member 30 is formed in a rectangular shape by punching a phosphor-bronze spring plate or a stainless steel spring plate. The flat spring member 30, moving from the rear end toward the front end as viewed in the figures, has a hinge section 31, an arm section 32 and a magnetic head holding section 33. The magnetic head gimbal mounting section 33 is the same as the magnetic head gimbal mounting 14 of the prior art in construction except that gimbal mounting 33 is integral with the flat spring 30. This is accomplished, for example, by stamping out the gimbal from the flat spring. A magnetic head 15 is attached adhesively or likewise to the magnetic head holding part 16 of the magnetic head holding section 33.

A reinforcement 34 made of a synthetic resin is molded around the flat spring member 30. In FIG. 3, the reinforcement 34 is separated from the flat spring member 30 to facilitate an understanding of the construction. The side edges of the arm section 32 and the magnetic head holding section 33, and the upper surface of the arm section 32 of the flat spring member 30 are covered with the side sections 34a and the central sections 34b, respectively. Grooves 34c of the reinforcement 34 allow the hinge section 31 and the magnetic head holding section 33 of the flat spring member 30 to flex and also restrict the waving and flexure of the arm section 32. The upper and lower parts of the reinforcement 34 are joined together through a plurality of holes 35 formed in the arm section 32. The reinforcement 34 has, as the integral parts, a protrusion 36 for providing a pivot point support which lightly depresses the magnetic head holding part 16 and a projection 12 similar to that of the prior art. The flat spring member 30 is screwed at the rear end thereof to the upper surface 40a of the rear end wall of a carriage 40.

The carriage 40 of this embodiment is formed in a rectangular shape by pressing a metal plate. The rear portion of the carriage 40 is bent substantially in an L-shape. The upper surface 40a of the rear end wall of the carriage 40 is declined slightly toward the front. A magnetic head 8 is attached adhesively or likewise to the upper surface of the front end of the carriage 40. Plates of various metals can be used to form the carriage 40, however, a thick plate of the same material as that of the flat spring member 30, such as a thick phosphor bronze plate or a thick stainless steel plate, is preferable since then the upper and lower head supports will have the same linear coefficients of thermal expansion. Similarly to the flat spring member 30, a part of the carriage 40, such as the rear end wall to which the flat spring member 30 is attached, may be provided with a reinforcement by encasement in a synthetic resin.

An oil retaining bearing in the form of a sleeve 41 is secured to one side edge of the carriage 40. The oil retaining bearing 41 is a single member formed of a sintered metal and is provided with a bore 41b having a predetermined length $L_4$. The oil retaining bearing 41 receives one side edge of the carriage 41 in a groove 41a formed therein and is fixed to the carriage 41 with rivets 42. Note that the length $L_4$ of the bearing sleeve 41 is greater than one half of the length $L_3$, thus minimizing the undesirable movements of prior art bearing mounts referenced as e and f in FIG. 1. As illustrated in FIG. 5, a guide shaft 7 is inserted through the bore 41b of the oil retaining bearing 41 to guide the carriage 40 for movement in directions indicated by a double-headed arrow a.

The upper and lower magnetic heads 15 and 8 supported on the magnetic head supporting device thus constructed are operated in the same manner as that of the prior art for recording and reproducing operation.

Since the hinge section 31, the arm section 32 and the magnetic head holding section 33 are formed integrally in the unitary flat spring member 30, the magnetic head supporting device can be easily and very accurately assembled by simply attaching the flat spring member 30 at the rear end (hinge section 31) thereof to the upper surface 40a of the rear end wall of the carriage 40. Furthermore, since the hinge section 31, the arm section 32 and the magnetic head holding section 33 need not each be assembled, errors in assembling the individual parts are eliminated. Hence, the adjustment of the magnetic head supporting device after assembly is greatly facilitated.

Since the arm section 32, as well as the hinge section 31 and the magnetic head holding section 33, is a part of the unitary flat spring member 30, there are only slight variations in dimension due to the changes in temperature and/or humidity. For example, the dimensions of the arm section 32 which require high accuracy, such as the distance $L_2$ between the center line of holes formed in the rear end of the flat spring member 30 for fixing the same to the carriage 40 and the center line of the magnetic head holding part 16, and the distance $W_2$ between the same holes formed in the rear end of the flat spring member 30 (FIG. 3), are now scarcely variable. Accordingly, undesired variation of the magnetic head 15 in tracking position relative to the magnetic tracks of the floppy disk 22 is prevented.

Referring now to FIG. 5, since the upper surface 40a of the rear end wall of the carriage 40 is declined slightly toward the front and since the flat spring member 30 is attached at the rear end thereof to the upper surface 40a of the rear end wall of the carriage 40, the unitary flat spring member 30 turns of its own resilience from an upper position indicated by alternate long and short dash lines to a lower position in a direction indicated by an arrow c. So, when a cartridge 23 is lowered from an upper position indicated by alternate long and short dash lines to its working position indicated by full lines in a direction indicated by an arrow d in FIG. 5 the unitary flat spring member 30 is biased in the direction indicated by arrow c of its own resilience. Therefore, the torsion coil spring 13 which is an integral part of the conventional magnetic head supporting device is unnecessary, thereby reducing the number of parts required. Furthermore, since the hinge section 31, the arm section 32 and the magnetic head holding section 33 are integrated into the unitary flat spring member 30, the load is not concentrated only on the hinge section 31, thereby extending the life of the hinge section 31.

Since the carriage 40 is formed by pressing a metal plate, preferably of the same material as the spring 30, the expansion and contraction of the carriage 40 attributable to changes in temperature and/or humidity is very small. Accordingly, the dimensions of the carriage 40 which require high accuracy, such as the horizontal distance $L_3$ between the center of the magnetic head 8 attached to the front end of the carriage 40 and the center line of holes formed in the upper surface 40a of the rear end wall of the carriage 40 (FIG. 1), vary only scarcely. Consequently, undesired variation of the magnetic head 15 in tracking and positioning relative to the magnetic tracks of the floppy disk 22 is prevented.

Since the individual oil retaining bearing 41 is secured to the carriage 40, the oil retaining bearing 41 also is affected scarcely by the variation of temperature and/or humidity, and hence the oil retaining bearing 41 is never deformed and the axis of the oil retaining bearing 41 is never dislocated. Accordingly, the carriage 40 is able to move always smoothly and accurately along the guide shaft 7 when the oil retaining bearing 41 is formed and secured to the carriage 40 accurately.

Although the invention has been described with particular reference to a preferred embodiment thereof, the present invention is not limited thereto and many changes and variations are possible in the invention without departing from the scope and spirit thereof.

For example, the shape of the unitary flat spring member integrally having the hinge section, the arm section and the magnetic head holding section may be any suitable shape including the rectangular shape of the flat spring member employed in the above-described preferred embodiment. The shape of the magnetic head holding part also may be any suitable shape, such as a circular shape.

In this embodiment, the flat spring member is urged downward of its own resilience, however, an additional torsion coil spring or extension coil spring may be provided for urging the flat spring member downward.

Although the present invention has been shown and described with respect to preferred embodiments, various changes and modifications which are obvious to a person skilled in the art to which the invention pertains are deemed to lie within the spirit and scope of the invention.

What is claimed is:

1. In a recording and reproducing device of the type in which a transducing head mounted on a carriage is selectively positionable to read or write data on a recording surface of a flat recording medium, the improvement of a transducing head supporting device comprising:
   an L-shaped head carriage comprised of a long leg extending parallel to the recording surface of the flat recording medium and a short leg extending perpendicular to the recording surface of the flat recording medium;
   means movable across the recording surface of the recording medium for mounting the head carriage;
   a flat spring for carrying the head and for resiliently biasing the head with respect to the long leg of the head carriage, the spring including three integrally formed portions, namely a hinge end portion attached to a distal end of the short leg of the head carriage, an arm portion extending generally parallel to the long leg of the head carriage and a head mounting portion for mounting the transducing head;
   reinforcement means for encasing at least the side edges of the arm portion and the head mounting portion of the first spring so as to leave exposed the area of the head mounting portion immediately surrounding the head to allow the hinge portion and the head mounting portion to flex while restricting flexure and waving of the arm portion, the reinforcement means further including a protrusion aligned with and adjacent to the head for lightly depressing the head relative to the flat spring and for providing a pivot point support for the head on its side opposite to the recording medium.

2. An improved transducing head supporting device as recited in claim 1 wherein said reinforcement means includes a first portion being connected to the arm portion of the flat spring and a pair of second portions extending from the first portion toward the head mounting portion, the pair of second portions having lengthwise grooves formed therein in which are received the side edges of the flat spring.

3. An improved transducing head supporting device as recited in claim 1 wherein said reinforcement means for encasing comprises a reinforcing casing of synthetic material molded about the flat spring.

4. An improved transducing head supporting device as recited in claim 1 wherein the distal end of the short leg of the head carriage is declined toward the long leg of the head carriage and the hinge end portion of the flat spring is mounted flush with declined distal end of the short leg of the head carriage.

5. An improved transducing head supporting device as recited in claim 1 wherein the head mounting portion comprises a gimbal which is integrally formed in the flat spring.

6. An improved transducing head supporting device as recited in claim 1 wherein the head carriage mounting means includes means to guide the head carriage in a direction parallel to the recording surface of the recording medium, the guide means including a shaft extending in the direction of the head carriage's movement, a sleeve bearing slidable along the shaft and extending over a length which is at least half the length of the long leg of the head carriage, and means for attaching the sleeve bearing to one edge of the long leg of the head carriage.

7. An improved transducing head supporting device as recited in claim 6 wherein the sleeve bearing is formed of oil-impregnated sintered metal.

8. An improved transducing head supporting device as recited in claim 1 wherein the head carriage and the flat spring are made of the same material to minimize the effects of thermal expansion and contraction.

9. An improved transducing head supporting device as recited in claim 1 wherein the head carriage is formed of a metal plate bent into an L-shape and the flat spring is made of the same metal.

10. An improved transducing head supporting device as recited in claims 8 or 9 wherein the flat spring is formed of a metal selected from the group consisting of phosphor-bronze and stainless steel.

11. In a recording and reproducing device of the type in which a transducing head is mounted on an L-shaped carriage which is movable in a direction which transports the transducing head across the recording surface of a flat recording medium, the improvement of a transducing head mounting means comprising:

means to guide the head carriage in a direction parallel to the recording surface of the recording medium, said means including a shaft extending in the direction of the head carriage's movement;

a sleeve bearing, formed of oil-impregnated, sintered metal, slidable along the shaft and extending over a length which is at least half of the length of the long leg of the head carriage; and means for attaching the sleeve bearing to one edge of the long leg of the head carriage.

* * * * *